(12) United States Patent
Hwang et al.

(10) Patent No.: US 9,177,411 B2
(45) Date of Patent: Nov. 3, 2015

(54) DISPLAY APPARATUS AND DISPLAY METHOD THEREOF

(71) Applicant: SAMSUNG ELECTRONICS CO., LTD., Suwon-si (KR)

(72) Inventors: Dong-choon Hwang, Suwon-si (KR); Ki-hyung Kang, Suwon-si (KR); Jung-hoon Yoon, Seongnam-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 13/912,817

(22) Filed: Jun. 7, 2013

(65) Prior Publication Data

US 2014/0192044 A1    Jul. 10, 2014

(30) Foreign Application Priority Data

Jan. 7, 2013 (KR) .................. 10-2013-0001802

(51) Int. Cl.
*G06T 15/00* (2011.01)
*H04N 13/04* (2006.01)
*H04N 13/00* (2006.01)

(52) U.S. Cl.
CPC ............ *G06T 15/00* (2013.01); *H04N 13/0404* (2013.01); *H04N 13/0409* (2013.01); *H04N 13/0415* (2013.01); *H04N 13/0422* (2013.01); *H04N 13/0447* (2013.01); *H04N 13/0475* (2013.01); *H04N 13/0011* (2013.01)

(58) Field of Classification Search
CPC .............. H04N 13/0422; G09G 2320/028; G09G 2300/0452
USPC .................. 345/589, 613, 694–696
See application file for complete search history.

(56) References Cited

U.S. PATENT DOCUMENTS

| | | | |
|---|---|---|---|
| 6,791,570 B1 * | 9/2004 | Schwerdtner et al. ........ | 345/613 |
| 7,719,552 B2 | 5/2010 | Karman | |
| 7,990,498 B2 * | 8/2011 | Hong ............................ | 349/106 |
| 8,537,200 B2 | 9/2013 | Zhang et al. | |
| 2008/0150936 A1 | 6/2008 | Karman | |
| 2011/0096832 A1 | 4/2011 | Zhang et al. | |

(Continued)

FOREIGN PATENT DOCUMENTS

| | | |
|---|---|---|
| KR | 10-2007-0011291 A | 1/2007 |
| KR | 10-2012-0071407 A | 7/2012 |

OTHER PUBLICATIONS

Search Report dated Apr. 9, 2014, issued by the International Searching Authority in counterpart International Application No. PCT/KR2014/000163.

(Continued)

*Primary Examiner* — Ke Xiao
*Assistant Examiner* — Whitney Pointe
(74) *Attorney, Agent, or Firm* — Sughrue Mion, PLLC

(57) ABSTRACT

A display apparatus includes a display panel which includes a plurality of sub pixels each outputting a sub pixel value of R, G, or B, a renderer which renders a multi-view image to be outputted by the display, and a controller which determines a rendering pitch according to a viewing distance of a user, and controls the renderer so that each of at least some of the plurality of sub pixels outputs a combined sub pixel value corresponding to a combination of sub pixel values corresponding to each of the plurality of views of the multi-view image according to the determined rendering pitch.

13 Claims, 15 Drawing Sheets

(56) References Cited

U.S. PATENT DOCUMENTS

| | | |
|---|---|---|
| 2011/0109629 A1* | 5/2011 | Ericson et al. ............... 345/423 |
| 2012/0013604 A1* | 1/2012 | Kang ........................... 345/419 |
| 2012/0019516 A1 | 1/2012 | Park et al. |
| 2012/0019518 A1 | 1/2012 | Kim et al. |
| 2012/0038754 A1 | 2/2012 | Na |
| 2012/0229595 A1 | 9/2012 | Miller |
| 2012/0249530 A1 | 10/2012 | Fukushima et al. |
| 2012/0274630 A1* | 11/2012 | Lin ............................... 345/419 |

OTHER PUBLICATIONS

Written Opinion dated Apr. 9, 2014, issued by the International Searching Authority in counterpart International Application No. PCT/KR2014/000163.

Communication, Issued by the European Patent Office, Dated Dec. 15, 2014, in counterpart European Application No. 13193513.2.

* cited by examiner (a)

(b)

DISPLAY APPARATUS AND DISPLAY METHOD THEREOF

CROSS-REFERENCE TO RELATED APPLICATION

This application claims priority from Korean Patent Application No. 10-2013-0001802, filed on Jan. 7, 2013 in the Korean Intellectual Property Office, the disclosure of which is incorporated herein by reference in its entirety.

BACKGROUND

1. Field

Apparatuses and methods consistent with what is disclosed herein relate to displaying, and more specifically, to a display apparatus with which a user can view three-dimensional images without glasses and a display method thereof.

2. Description of the Related Art

Pursuing an objective of viewing images with more reality, efforts to develop three-dimensional (3D) display apparatuses have accelerated recently. Accordingly, 3D image signals which are typically watched in a theater have been made available for viewing in homes using display apparatuses such as televisions (TVs).

Meanwhile, 3D display apparatuses may be classified as glasses type displays and non-glasses type displays according to whether glasses are or are not required for a user to watch 3D images.

As one example of the glasses system, a shutter glasses type display apparatus can be discussed. This method provides dimensional feelings to a user by alternately closing and opening a left-eye shutter and a right-eye shutter of shutter glasses that a user wears while coordinating the shutters with the alternately outputted left-eye and right-eye images.

Non-glasses systems are also referred to as "autostereoscopy". A non-glasses type 3D display apparatus provides dimensional feelings by projecting light corresponding to images having different views toward the left and right eyes using parallax barrier technology or lenticular lenses while displaying optically divided multi-view images.

Meanwhile, regarding non-glasses type 3D display apparatuses, limitations in viewing distance may occur due to technological features. The use of a parallax barrier or a lenticular lens determines viewing distance. When a user views images outside of certain predetermined viewing distances, crosstalk may occur and disturb ordinary viewing.

FIG. 1 is a diagram provided to explain operation of displaying multi-view images in a non-glasses type 3D display apparatus. Specifically, FIG. 1 is a diagram displaying images having multi views. Specifically, FIG. 1 shows the display of 6 views in total. Referring to FIG. 1, when a viewing distance is L1, a first row of the non-glasses type 3D display apparatus may project a first image view toward a left eye and a second image view toward a right eye. Therefore, a user can perceive the dimension of the image by receiving different views with left and right eyes.

However, when the viewing distance changes to L1', both the second image view and the first image view may be projected toward the user's left eye, and both the first image view and the second image view may be projected toward a user's right eye. Therefore, because crosstalk may occur as the viewing distance of the user changes, the quality of the perceived image deteriorates and the user's viewing may be disturbed.

SUMMARY

One or more exemplary embodiments may overcome the above disadvantages and other disadvantages not described above. Also, the exemplary embodiments described herein are not required to overcome the disadvantages described above, and an exemplary embodiment may not overcome any of the problems described above.

An objective of one or more exemplary embodiments is to provide a display apparatus which decreases crosstalk and improves the displaying quality by rendering multi-view images based on viewing distance.

According to an aspect of an exemplary embodiment, a display apparatus may include a display which may include a plurality of sub pixels outputting a sub pixel value of R, G, or B, a renderer which renders a multi-view image to be outputted by the display, and a controller which determines a rendering pitch according to a viewing distance of a user, and controls the renderer so that at least some of the plurality of sub pixels output a combined sub pixel value corresponding to a combination of sub pixel values corresponding to each of a plurality of views of the multi-view image according to the determined rendering pitch.

Herein, the controller may control the renderer so that each of at least some of the plurality of sub pixels outputs a combined sub pixel value calculated based on a first sub pixel value of a first image view of the multi-view image and a second sub pixel value of a second image view of the multi-view image.

Further, the controller may calculate the combined sub pixel value based on a mixing ratio of the first sub pixel value and the sub second pixel value determined according to the rendering pitch.

The controller may determine the rendering pitch so as to be inversely proportional to the viewing distance of the user.

The rendering pitch may be determined by a following mathematical formula:

$$X = \frac{(L_1 + L_2)P_1}{L_1 \times N}$$

wherein X is the rendering pitch, N is a number of views of the multi-view image, L1 is the viewing distance of the user, L2 is a distance from one of a parallax barrier and a lenticular lens to the display panel, and P1 is one of a length of the parallax barrier and a length of the lenticular lens for one frequency corresponding to the N views of the multi-view image.

According to an aspect of another exemplary embodiment, a display method may include determining a rendering pitch according to a viewing distance of a user, rendering a multi-view image so that at least some of a plurality of sub pixels of the display output combined pixel values corresponding to a combination of sub pixel values corresponding to the plurality of views of the multi-view image, and outputting the multi-view image according to rendering results.

Herein, the rendering may be performed so that the combined sub pixel value is calculated based on a first sub pixel value of a first view of the multi-view image and a second sub pixel value of a second view of the multi-view image.

Further, the rendering may calculate the combined sub pixel value based on a mixing ratio of the first sub pixel value and the second sub pixel value determined by the rendering pitch.

The rendering pitch may be inversely proportional to the viewing distance of a user.

The rendering pitch may be determined by a following mathematical formula:

$$X = \frac{(L_1 + L_2)P_1}{L_1 \times N}$$

wherein X is the rendering pitch, N is a number of views of the multi-view image, L1 is the viewing distance of the user, L2 is a distance from one of a parallax barrier and a lenticular lens to a display panel, and P1 is one of a length of the parallax barrier and a length of a lenticular lens for one frequency corresponding to the N number of views of the multi-view image.

According to one or more of the exemplary embodiments, quality in delivering images may be enhanced by reducing crosstalk even when a user moves out of an optimized viewing distance. Thus, broader of viewing distance may be obtained.

BRIEF DESCRIPTION OF THE DRAWINGS

The above and/or other exemplary aspects and advantages will be more apparent based on the following description of exemplary embodiments with reference to the accompanying drawings, in which.

DETAILED DESCRIPTION

Figure 1:
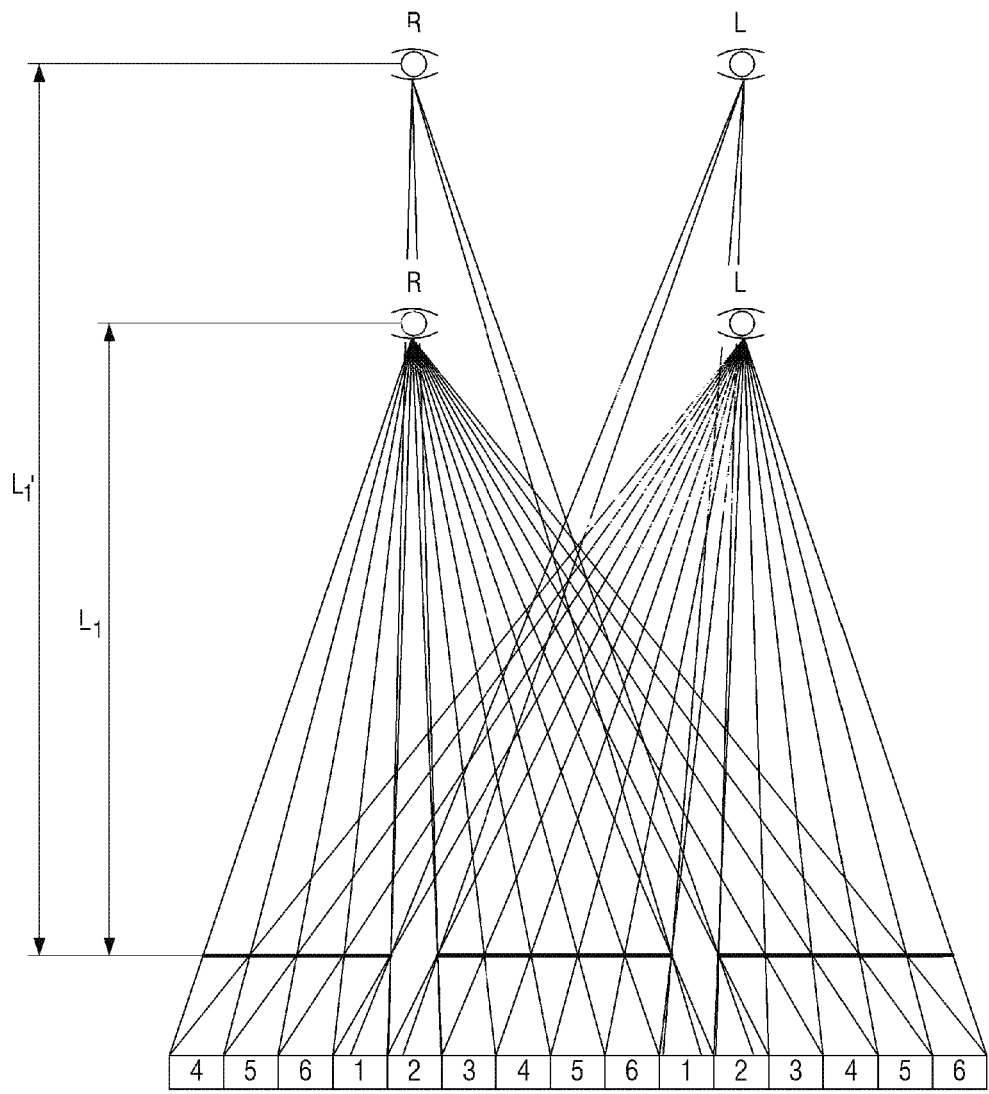
FIG. 1 is a block diagram provided to explain the display of multi-view images using a non-glasses type three-dimensional (3D) display apparatus.

Certain exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding of the present inventive concept. Accordingly, it is apparent that the described exemplary embodiments can be carried out without those specifically defined matters. Also, well-known functions or constructions are not described in detail since they would obscure the description with unnecessary detail.

Figure 2:
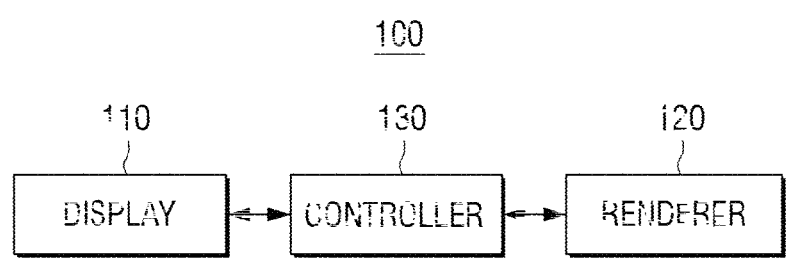
FIG. 2 is a block diagram of a display apparatus according to an exemplary embodiment.

FIG. 2 is a block diagram provided to explain a display apparatus according to an exemplary embodiment. A display apparatus 100 may be implemented as any of various types of devices such as a television (TV), a monitor, a personal computer (PC), a cellular phone, a laptop computer, a tablet PC, an electronic frame, an electronic book, a personal digital assistant (PDA), or another type of device. Specifically, the display apparatus may implement and a non-glasses type #D display method.

Referring to FIG. 2, the display apparatus 100 includes a display 110, a renderer 120, and a controller 130.

The display 110 outputs multi-view images rendered in the renderer 120. Thus, the display may include a plurality of pixels. Each pixel may include a plurality of sub pixels each of which output one pixel value of red (R), green (G), or blue (B).

The display 110 may include a display panel (not illustrated) and a barrier (not illustrated) in order to provide a non-glasses type 3D display. The display panel outputs the multi-view images. The term "multi-view images" as used herein refers to a plurality of views of the same object which are photographed from different positions. For example in a multi-view image including two views, a left-eye image view and a right-eye image view may be alternately and repeatedly arranged to construct one image frame. Alternatively, more than four image views may be combined to constitute a single image frame. Such multi-view images may be provided from external sources such as a broadcasting station or a web server, an external or internal recording medium, or a play back apparatus.

The display panel may be implemented as any of various display panels such as a cathode ray tube (CRT), a liquid crystal display (LCD), a plasma display panel (PDP), or an organic light emitting diode (OLED).

The barrier is mounted on one side of the display panel and selectively transmits light corresponding to the multi-view images. The barrier may be arranged in front of or behind the display panel, may include a liquid crystal layer and an electrode layer, and may selectively transmit light corresponding to the multi-view images as the optical features of the liquid layer changes according to whether an electric field is applied by electrodes. Thus, a user can perceive the dimension of a displayed image by having different views transmitted toward a left eye and a right eye.

The above exemplary embodiment describes that the display 110 includes a barrier; however, the display 110 may alternately include a lens sheet (not illustrated) instead of the barrier according to an alternative lenticular lens method.

The lens sheet may include a substrate, electrodes, a liquid crystal layer, and a medium layer. The lens sheet may control light refraction corresponding to a multi-view image transmitted through the lens, which is caused by changes in optical features according to whether an electric field is applied by the electrodes.

Figure 4:
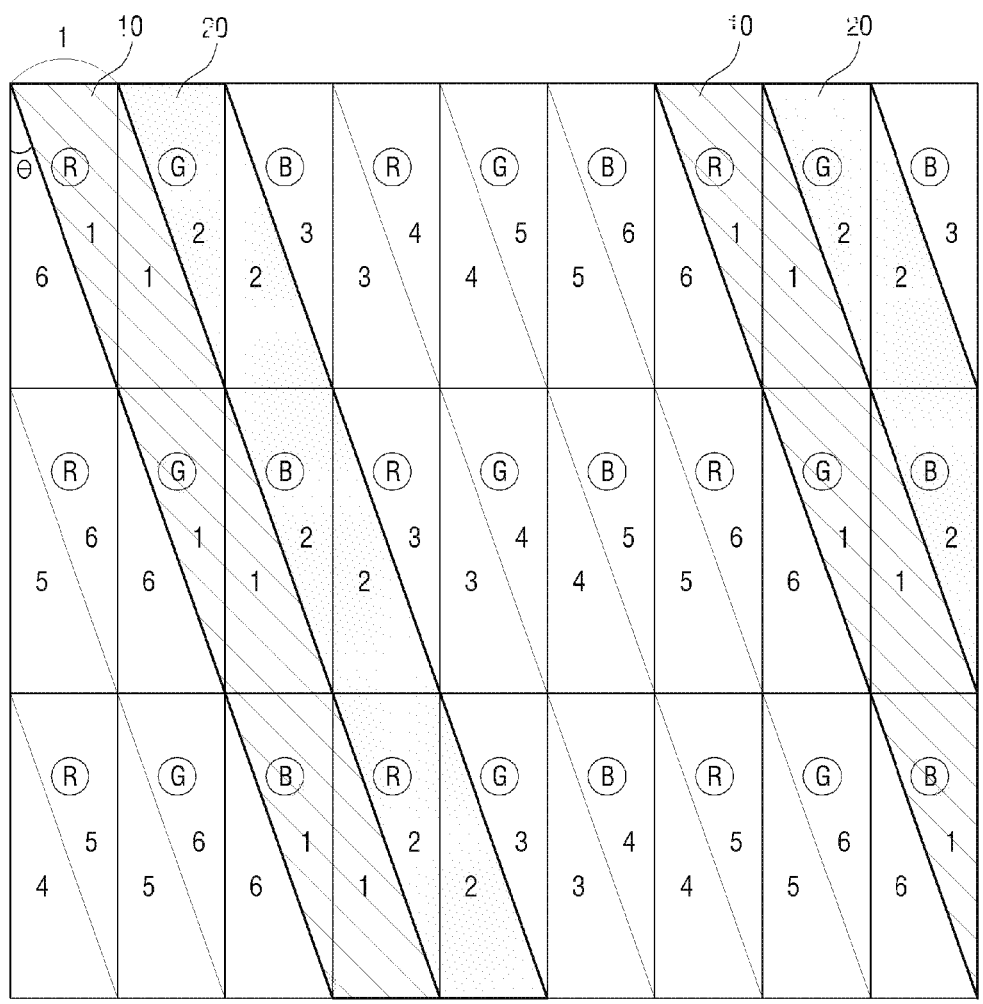
FIGS. 4 to 6 are diagrams of a rendering method according to an exemplary embodiment.

The barrier or the lens sheet of the display 110 may operate while being tilted at a certain angle to improve definition. A viewer may watch areas which are inclined toward a specific direction instead of areas oriented in a vertical or horizontal direction. Thus, a viewer can view a portion of each sub pixel, rather than a complete sub pixel. For example, when a viewer watches a first image view with a right eye and a second image view with a left eye, the right eye may view an area 10 corresponding to the first image view and the left eye may view an area 20 corresponding to the second image view, as shown in FIG. 4.

In this way, the tilt of the barrier or the lens sheet of the display 110 at a certain angle enables a viewer to watch a portion of each sub pixel rather than one complete sub pixel.

The renderer 120 renders multi-view images to be outputted to the display 110. Specifically, the renderer 120 may render the multi-view images so that at least some sub pixels, of a plurality of sub pixels, output sub pixel values (brightness) corresponding to a plurality of multi-view images, according to a rendering pitch determined based on the viewing distance of a user. A rendering method determined according to a rendering pitch will be described below with reference to FIGS. 4 and 5.

The controller 130 controls general implementations of the display apparatus 100. Specifically, the controller 130 may control the renderer 120 and the display 110 to render and to output the images based on viewing distance.

Figure 3:
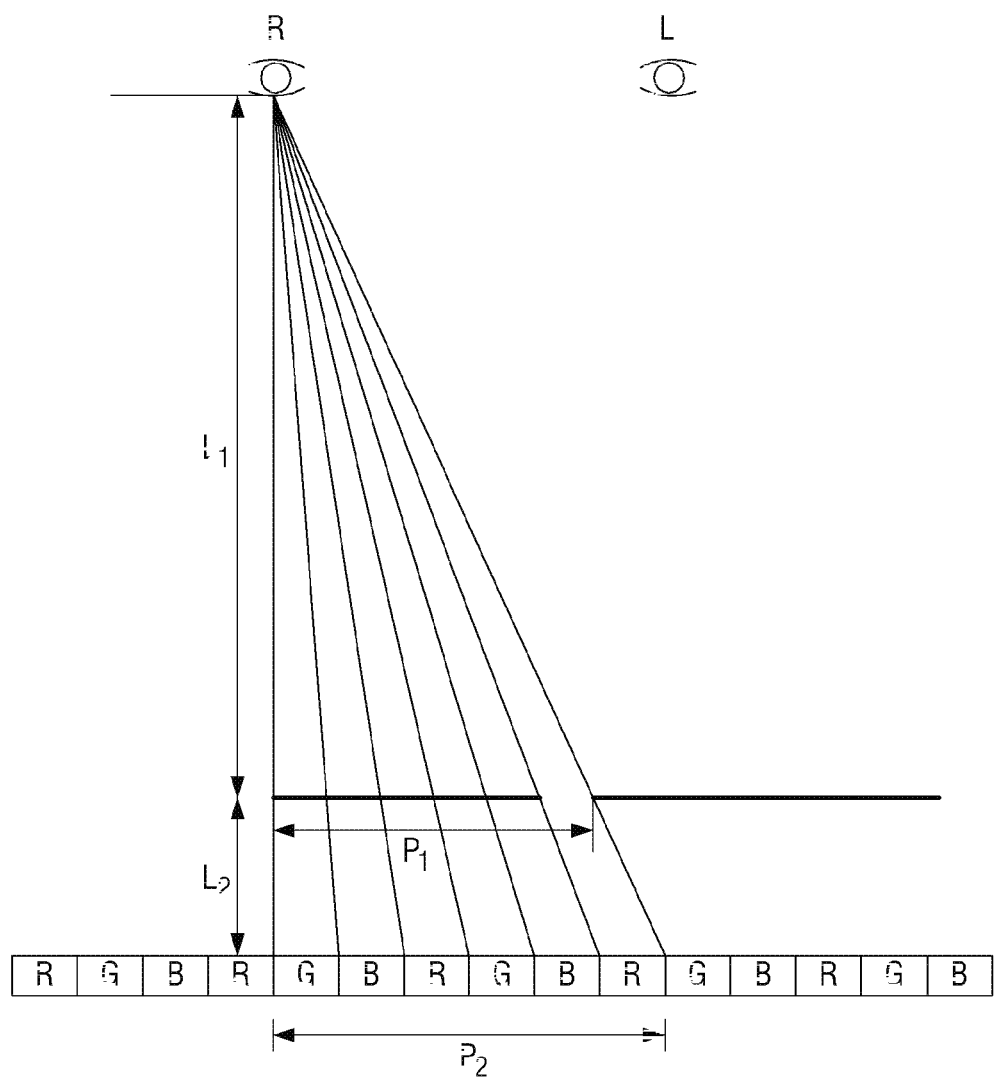
FIG. 3 is a diagram provided to explain a method for determining rendering pitch according to the viewing distance of a user.

The controller 130 may determine a rendering pitch according to the viewing distance of a user. The term "rendering pitch" refers to the minimum number of sub pixels on which one image view will be displayed. For example, when six image views, a first image view through a sixth image view, are displayed on each of 6 sub pixels, as illustrated in FIG. 1, the rendering pitch is 1 because a single image view is displayed for each sub pixel. Referring to FIG. 3, a detailed process of determining the rendering pitch according to the viewing distance of a user will be explained.

FIG. 3 is a diagram provided to explain a method for determining the rendering pitch according to a viewing distance of a user. Referring to FIG. 3, the following mathematical formula 1 can be laid down according to a triangle proportional expression.

[Formula 1]

$$L_1 : P_1 = (L_1 + L_2) : P_2 \quad (1)$$

$$L_1 \times P_2 = (L_1 + L_2) P_1 \quad (2)$$

$$P_2 = \frac{(L_1 + L_2) P_1}{L_1} \quad (3)$$

wherein L1 is distance from a user to the parallax barrier or to the lenticular lens, i.e., a viewing distance. L2 is distance from the parallax barrier or the lenticular lens to the display panel, PI is a length of the parallax barrier or of the lenticular lens for one frequency corresponding to a single image view, and P2 is pixel length for one frequency corresponding to a single image view.

L2 is fixed and P1 may be determined according to the number of displayed image views. Thus, according to equation (3) of the formula 1, P2 may be determined with based on a viewing distance L1.

Meanwhile, P2 may be determined by multiplying the rendering pitch X by the number of views N as in a formula 2 below.

$$P_2 = X \times N \quad \text{[Formula 2]}$$

Consequentially, the rendering pitch X may be determined by using the formulae 1 and 2 as shown in a formula 3 below.

$$X = \frac{(L_1 + L_2) P_1}{L_1 \times N} \quad \text{[Formula 3]}$$

Referring to formula 3, the rendering pitch X is inversely proportional to the viewing distance L1. Therefore, when the viewing distance of the user becomes shorter, the rendering pitch X will be determined to be larger. When viewing distance of a user becomes greater, the rendering pitch X will be determined to be smaller. For example, when a standard viewing distance is established to be 3 m, the rendering pitch may be 1, and the rendering pitch may be greater than 1 when the viewing distance of a user is less than 3 m, and the rendering pitch may be smaller than 1 when the viewing distance of a user is greater than 3 m.

When it is assumed that the parallax barrier is fixed in the parallax method, the reason why the rendering pitch is inversely proportional to viewing distance is that dimensional sizes which a user can watch between the barriers become broader as viewing distance of a user becomes shorter, and vice versa.

When the rendering pitch is determined, the controller 130 may control the renderer 120 to perform rendering according to the rendering pitch. The controller 130 may control the renderer 120 to arrange the multi-view images such that two or more image views are displayed within a single pixel, constituting R, G, and B sub pixels, rather than arranging them so that only a single image view is displayed within one pixel. Furthermore, the controller 130 may control the renderer 120 so that two or more image views are displayed within a single sub pixel. For example, the controller 130 may control the renderer 120 to output to a sub pixel a combined sub pixel value calculated based on both a first sub pixel value corresponding to a first image view and a second sub pixel value corresponding to a second image view. Herein, the combined sub pixel value may be calculated by a mixing ratio of the first sub pixel value and the second sub pixel value, and the mixing ratio of the first and second sub pixel values may be determined based on the rendering pitch. More specifically, when the rendering pitch is determined, the combined sub pixel value may be determined based on the percentage of the sub pixel area covered by each of the first image view and the second image view.

Figure 5:
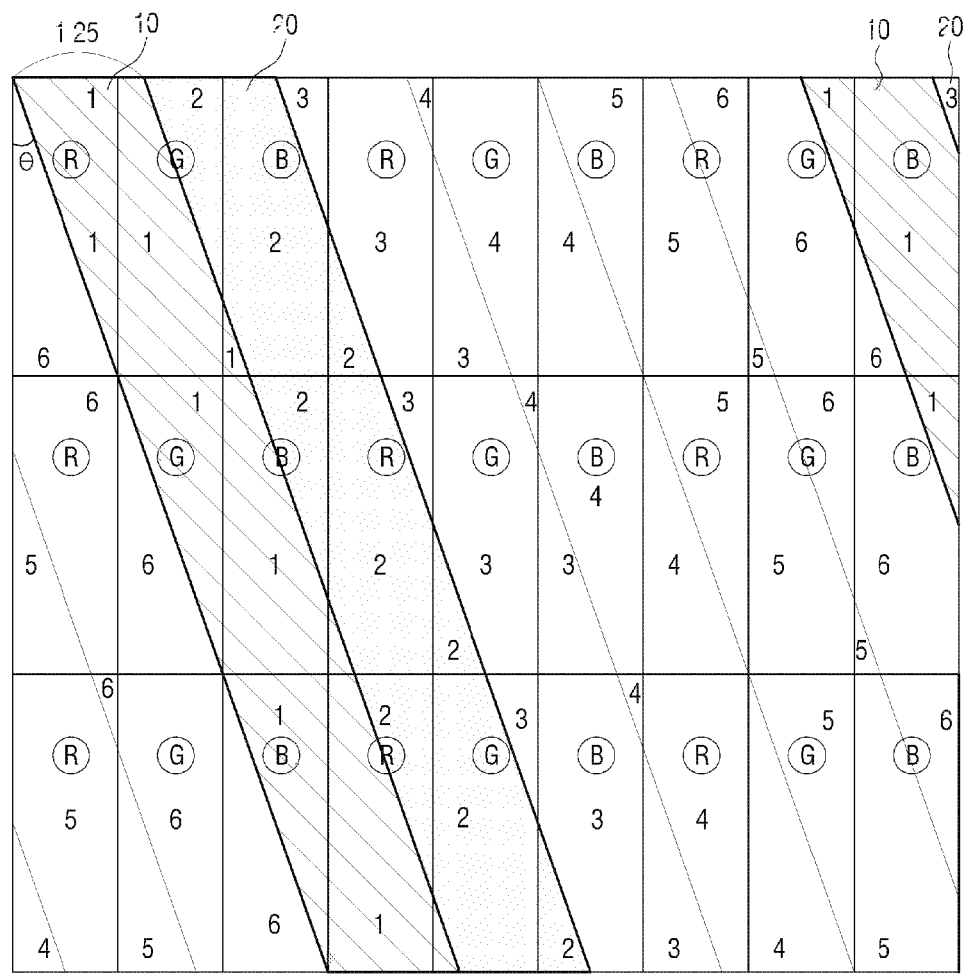
Figure 6:
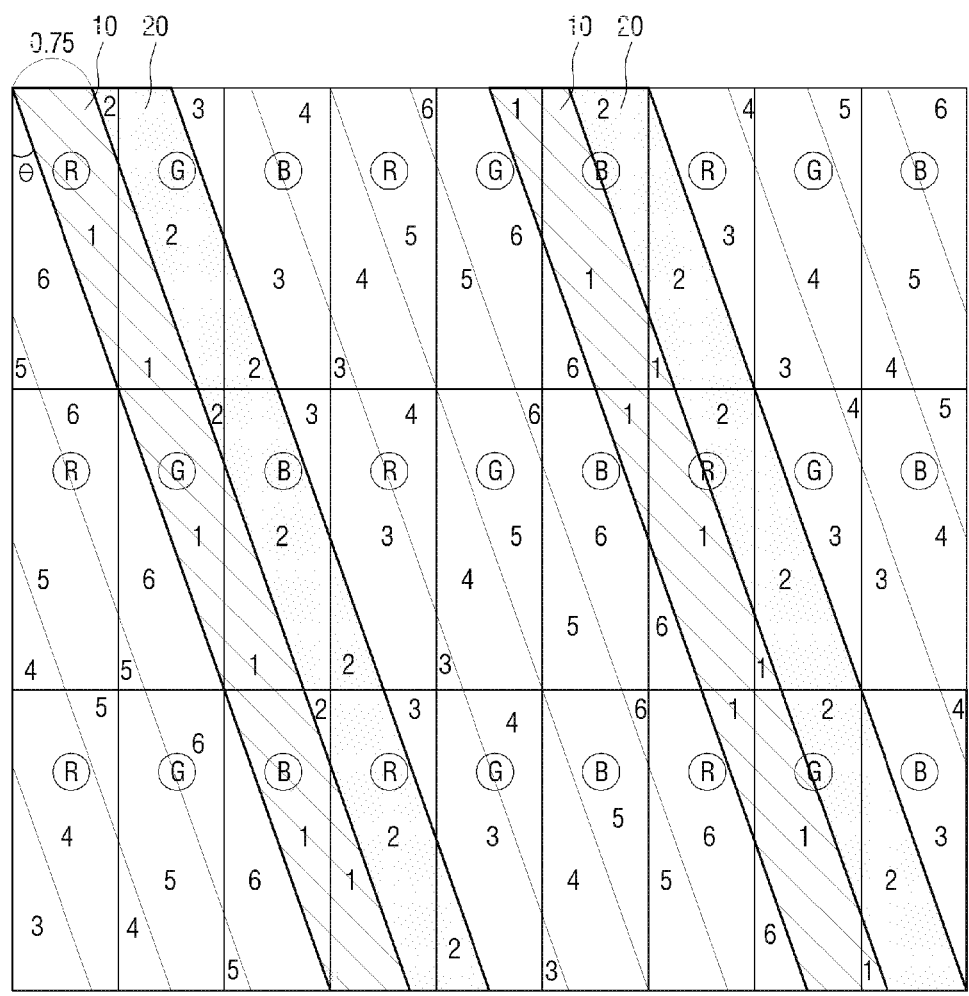

FIGS. 4 to 6 are diagrams of a rendering method according to an exemplary embodiment. Specifically, FIG. 4 is a diagram provided to explain a rendering method when the rendering pitch is 1. Referring to FIG. 4, a first sub pixel in a first row may output a combined sub pixel value combining a sub pixel value of a sixth image view and a sub pixel value of a first image view. A second sub pixel in the first row may output a combined sub pixel value combining a sub pixel value of a first image view and a sub pixel value of a second image view.

Herein, displayed sub pixel values for each of the sub pixels are determined based on the rendering pitch. When the rendering pitch is determined, the pixel sub values may be determined according to the percentage of the sub pixel area covered by each of the image views displayed by the pixel. In FIG. 4, when the rendering pitch is determined to be 1, the ratio of the percentage of the first sub pixel area covered by the sixth image view and the first pixel area covered by the first image view is 1:1. Therefore, from the first sub pixel, a combined sub pixel value in which R of the first image view and R of the sixth image view are combined in a ratio of 1:1 may be calculated. For example, when the R sub pixel value of the sixth image view is 150 and the R sub pixel value of the first image view is 200, the R combined sub pixel value of the first sub pixel may be calculated to be 175. When the rendering pitch is 1, sub pixel values of all the sub pixels may be calculated according to a mixing ratio of 1:1.

FIG. 5 is a diagram provided to explain the rendering method when the rendering pitch is greater than 1. Referring to FIG. 5, a first sub pixel in a first row may output a combined sub pixel value in which a sixth image view and a first image view are combined. A second sub pixel in the first row may output a combined sub pixel value in which a first image view and a second image view are combined. Further, a third sub pixel in the first row may output a combined sub pixel value in which a first image view, a second image view and a third image view are combined.

Herein, combined sub pixel values of each of the sub pixels are determined based on the rendering pitch. In FIG. 5, when the rendering pitch is determined to be 1.25, the dimensional ratio by which the first image view and the second image view are combined in the second sub pixel becomes 23:9. Therefore, in the second sub pixel, a combined sub pixel value combines G of the first image view and G of the second image view by a ratio of 23:9. For example, when the G sub pixel value of the first image view is 64 and the G sub pixel value of the second image view is 32, the G combined sub pixel value of 55 can be calculated for the second sub pixel. When more than three image views are combined in a single sub pixel, as in the third sub pixel in the first row of FIG. 5, a combined sub pixel value may be calculated in proportion to the percentages of the area of the third sub pixel covered by the first, second, and third image views.

FIG. 6 is a diagram provided to explain the rendering method when the rendering pitch is smaller than 1. Referring to FIG. 6, a first sub pixel in a first row may output a combined sub pixel value which combines the sub pixel values for the fifth, sixth, first, and second image views. A second sub pixel in the first row may output a combined sub pixel value which combines the sub pixel values for the first, second, and third image views. Further, a third sub pixel in the first row may output a combined sub pixel value which combines the sub pixel values of the second, third, and fourth image views.

Herein, the combined sub pixel values for in each of the sub pixels are determined by the rendering pitch. In FIG. 6, when the rendering pitch is determined to be 0.75, the ratio of the percentages of the area of the sub pixel covered by the first, second, and third image views becomes 9:19:4. Therefore, on the second sub pixel, a combined sub pixel value in which G sub pixel values of the first, second, and third image views are combined by 9:19:4 may be calculated. For example, when the G sub pixel value of the first image view is 64, the G sub pixel value of the second image view is 32, and the G sub pixel value of the third image view is 128, the G combined sub pixel value of 53 may be calculated for the second sub pixel. Meanwhile, when four image views are combined as is the case in the first and fourth sub pixels in the first row, each combined sub pixel value may be calculated based on the proportion of the area of the sub pixel covered by each of the four image views.

FIGS. 4 to 6 explain that multi-view images may have 6 views in total; however, the same methods as described above may be uniformly applied to a multi-view image having 2, 4, 9, 18, 30, or 36 views.

Meanwhile, FIGS. 4 to 6 explain that interval of image views rendered according to the rendering pitch is the same; however, the intervals of the multi-view images rendered may be different according to various embodiments. Such points will be further described by referring to FIGS. 7 and 8.

Figure 7:
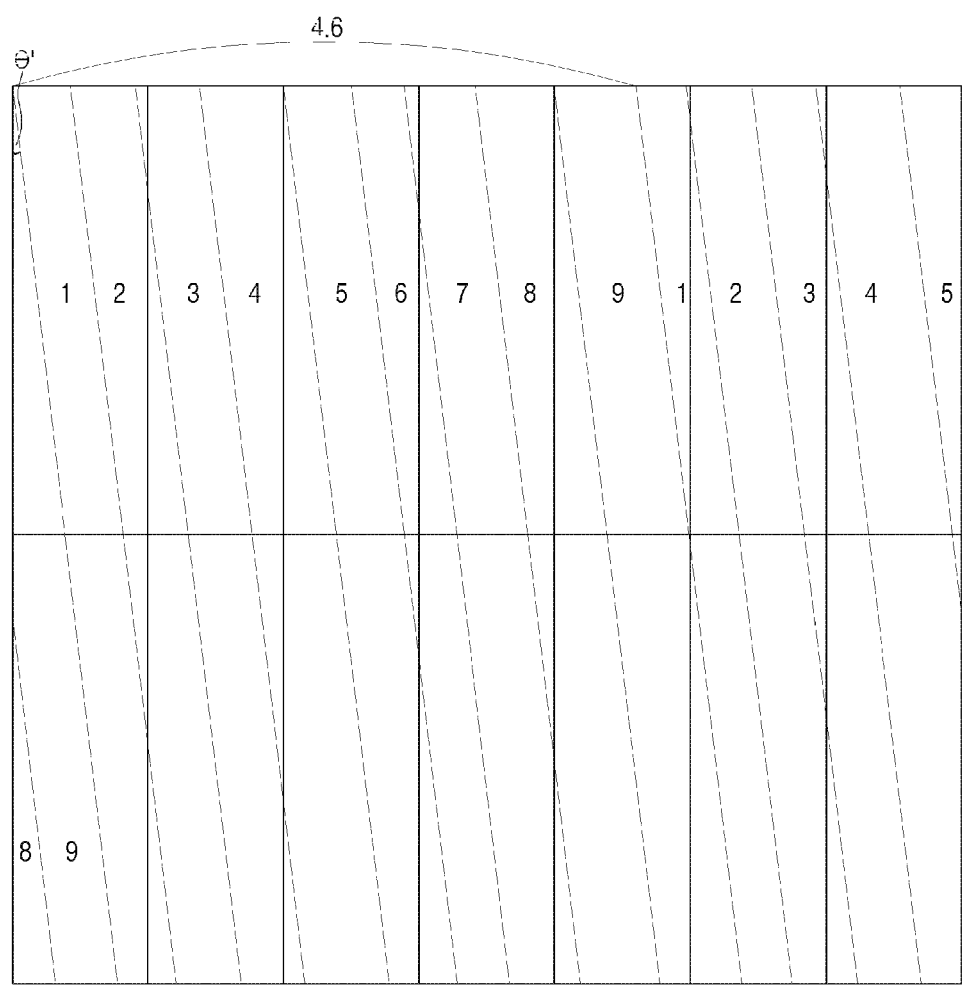
FIG. 7 is a diagram provided to explain a rendering method according to another exemplary embodiment.
Figure 8:
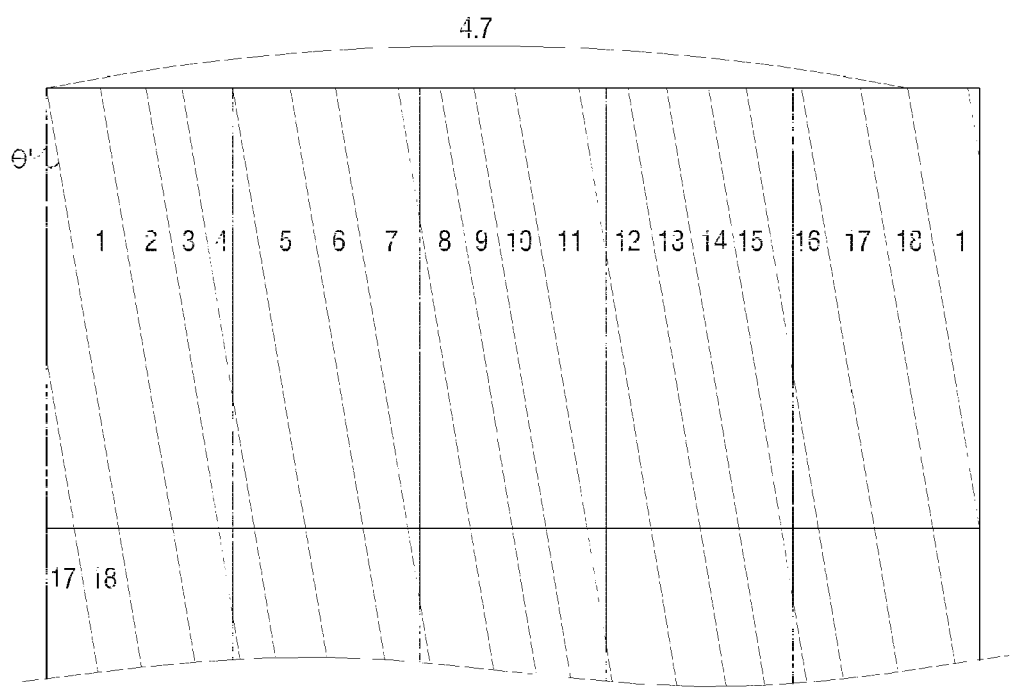
FIG. 8 is a graph showing rendering frequency according to the rendering method of FIG. 7.

FIGS. 7 and 8 are diagrams of a rendering method according to another exemplary embodiment. Specifically, FIG. 7 is a diagram provided to explain how multi-view images having 9 views in total may be rendered, and FIG. 8 is a diagram provided to explain how multi-view images having 18 views in total may be rendered. Referring to areas in which images having 9 views in total are rendered in FIG. 7, intervals of areas which multi-view images are rendered are different from each other. In other words, at least some of the multi-view images may be combined using intervals different from the determined rendering pitch. However, even in this case, pixel intervals over which all the multi-view images for one frequency are arranged are the same. In other words, while the intervals for the individual views may be different, the entirety of the nine views of FIG. 7 repeat with a fixed frequency of 4.6 sub pixels. Thus, as here, when the intervals at which the multi-view images are arranged are different, the rendering pitch X times the number of total views in the images N has the same interval. In FIG. 7, images having 9 views in total are combined based on a frequency of 4.6 sub pixels. Likewise in FIG. 8, showing areas in which images having 18 views in total are rendered, intervals at which the individual views are rendered are different. However, all of the 18 views are repeatedly arranged on a fixed frequency of 4.7 sub pixels. In the embodiments of FIGS. 7 and 8, a sub pixel interval by which the multi-view images for one fixed frequency are arranged is determined according to a viewing distance, and the multi-view images may be based on the determined sub pixel interval of the single fixed frequency.

FIGS. 4 to 6 illustrate that the parallax barrier or the lenticular lens is tilted by θ; however, the parallax barrier or the lenticular lens may be tilted by any of various angles according to various embodiments. FIGS. 7 and 8 illustrate an embodiment which the parallax barrier or the lenticular lens is tilted by θ.

Figure 9:
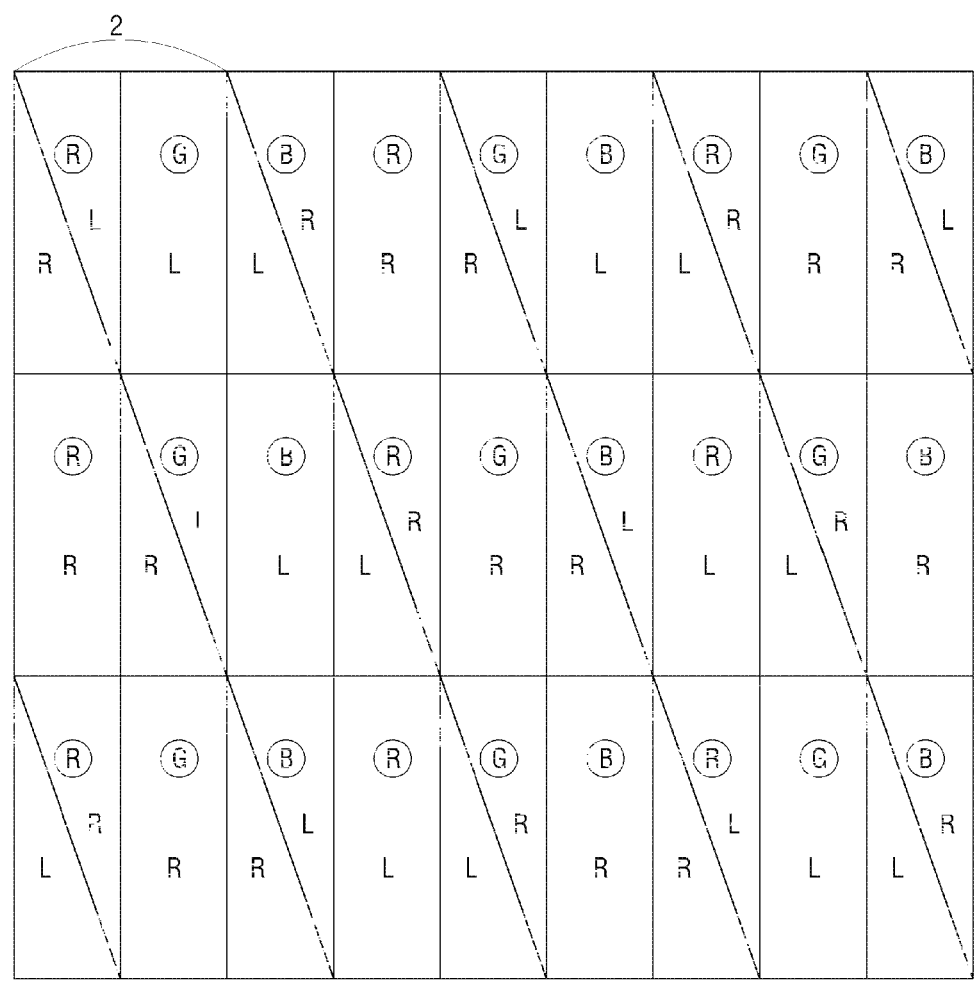
FIG. 9 is a diagram provided to explain a method for calculating pixel values by using a rendering frequency graph.
Figure 10:
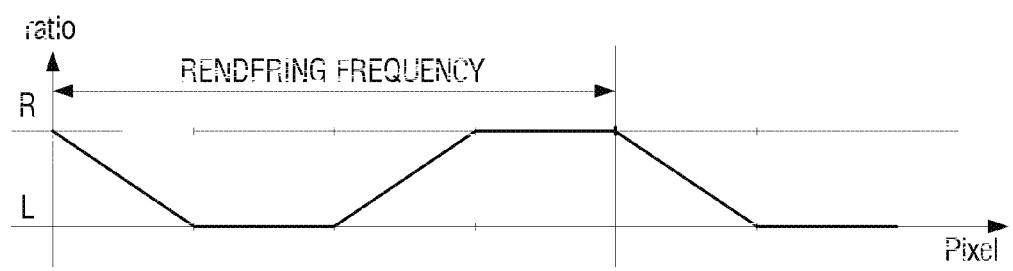
FIG. 10 is a diagram provided to explain a trend of a rendering frequency graph according to a viewing distance.

In the following, the rendering method using a rendering frequency will be described by referring to FIGS. 9 to 14. FIG. 9 is a diagram provided to explain a rendering method according to another exemplary embodiment. Specifically, FIG. 9 is a diagram provided to explain the image rendering method when multi-view images include 2 views in total. FIG. 10 is a graph showing the rendering frequency according to the rendering method of FIG. 9.

Figure 11:
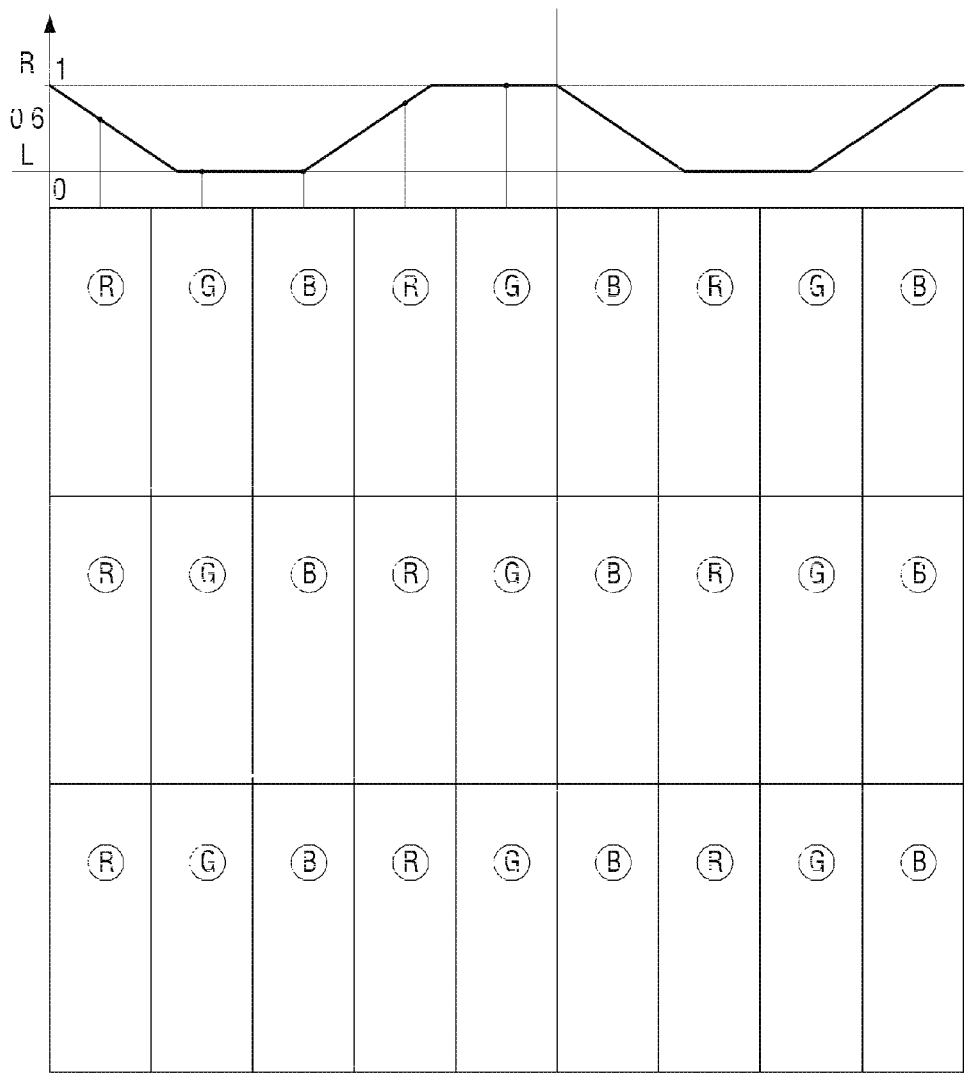
FIG. 11 is a diagram provided to explain the decreasing effects of crosstalk due to moderating the ratios of the rendering frequency graph of FIG. 10.

When multi-view images include 2 views in total, the views may be classified as R views and L views. In general, R views and L views are repeatedly arranged in each of the sub pixels by establishing the rendering pitch to be 1 from a standard viewing distance (an optimized viewing distance established in the display apparatus). However, when the rendering pitch is established to be 2 from the standard viewing distance and rendering is performed such as L, L, R, R, L, L, R, R, . . . , this may be effective to reduce crosstalk. Herein, when the rendering pitch is established to be 2 and when the parallax barrier or the lenticular lens is tilted, the R and L views are arranged such that the sub pixels repeat in an order to a R view sub pixel, a L view sub pixel, and a R view and L view combined sub pixel. When the ratio of sub pixel values of the sub pixels in a row direction of FIG. 9 is expressed in a graph, a periodic graph as illustrated in FIG. 10 is the result. In FIG. 10, the X axis indicates the position of sub pixels, and the Y axis indicates the mixing ratio of the R view and the L view in each sub pixel. Herein, the rendering frequency may be expressed as the rendering pitch times the number of total views. In FIG. 10, because the rendering pitch is 2 and the number of total views is 2, the rendering frequency is 4. Sub pixel values according to the rendering pitch may be calculated by using the graph of FIG. 10. Referring to FIG. 11, a process calculating pixel values will be further described below.

FIG. 11 is a diagram provided to explain a method of calculating pixel values by using the rendering frequency graph. Specifically, FIG. 11 is a diagram illustrating an embodiment in which the rendering pitch is 2.5 by using the rendering frequency graph. When the rendering pitch is 2.5, the rendering frequency may be calculated as 5 by multiplying the rendering pitch 2.5 by the number of total views 2. Thus, the rendering graph of FIG. 10 may repeat on a frequency of 5 pixels. Accordingly, a periodic graph may be drawn based on the frequency of 5 pixels in FIG. 11. The mixing ratio of sub pixels may be determined by a y coordinate value in the middle position of each sub pixel. Herein, it is assumed that the L view has a sub pixel value of 0 and the R view has a sub pixel value of 1, and the mixing ratio of L views and R views in each sub pixel is (1−y):y. For example, an x coordinate value in the middle of a first sub pixel in a first row is 0.5 in FIG. 11. A y coordinate value of the first sub pixel in the first row may be 0.6. L images and R images may be combined by the ratio of (1−0.6):0.6, i.e., 2:3. When mixing ratios of the second to fifth sub pixels in the first row are calculated according to the above method, they are determined to be 1:0, 1:0, 1:4, and 0:1. Mixing ratios of other sub pixels may be calculated according to the same method. However, when the parallax barrier or the lenticular lens is tilted, a standard position of the rendering frequency graph may be different for each row.

Figure 12:
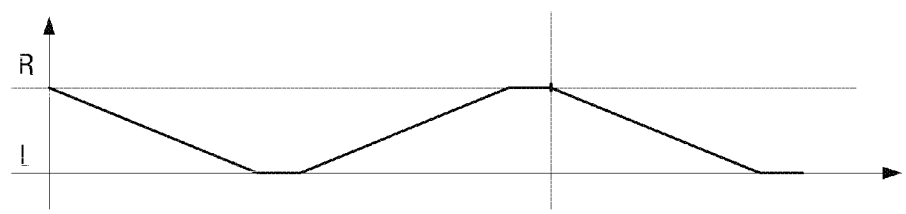
FIG. 12 is a diagram provided to explain the rendering frequency graph according to a viewing distance.
Figure 12:
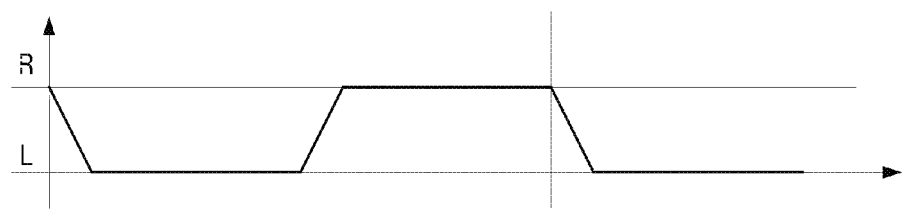

FIG. 12 is a diagram provided to explain a form of the rendering frequency graph according to viewing distance. When rendering is performed using the rendering frequency, the form of the graph changes according to the viewing distance. Specifically, with a near viewing distance, as shown in FIG. 12A, the ratio of intervals only including the L image view or the R image view decreases, and the ratio of the intervals combining the L image view and the R image view increases. For example, the ratio between the intervals only including the L image view or the R image view and the intervals combining the L image view and the R image view may be 1:4. In contrast, with a far viewing distance, as shown in FIG. 12B, the ratio of intervals only including the L image view or the R image view increases and the ratio of intervals combining the R image view and the L image view decreases. For example, the ratio between the intervals only including the L image view or the R image view and the intervals combining the R image view and the L image view may be 4:1. When the ratio of the rendering frequency graph is moderated according to viewing distance, it may be effective in further reducing crosstalk.

When a ratio of the rendering frequency graph is moderated according to the viewing distance, the mixing ratio of sub pixels may be determined as shown in FIG. 9. Thus, further explanations are not included.

Figure 13:
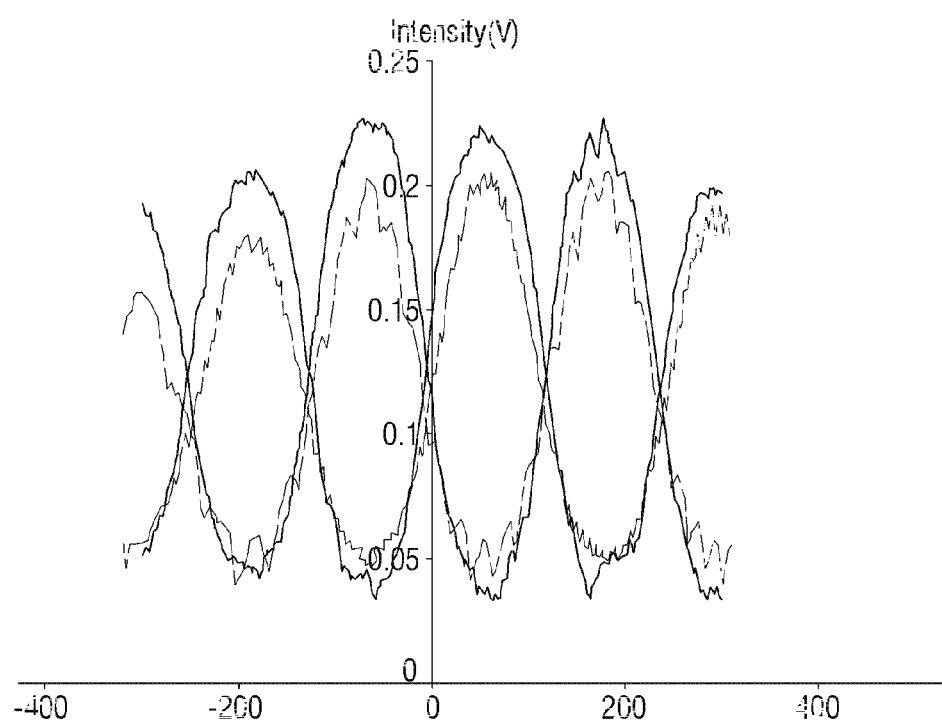
FIG. 13 is a diagram provided to explain the effects of reducing crosstalk by moderating the ratios of the rendering frequency as shown in FIG. 12.

FIG. 13 is a diagram provided to explain effects in reducing crosstalk according to moderating the ratio of the rendering frequency graph as shown in FIG. 12. Specifically, FIG. 13 explains the effect of reducing crosstalk at a far viewing distance. Values shown with the solid line in FIG. 13 are an optical wave form according to the a related art rendering method. Values shown with the dotted line are an optical wave form according to a rendering method using the rendering frequency graph of FIG. 12B. Referring to FIG. 13, with a far viewing distance, a method according to exemplary embodiments described herein may result in extending the width of the wave form, increasing the differences in brightness, and reducing the width of viewing zone to be sharper wave form.

Additionally, though not illustrated in FIG. 13, with a near viewing distance, i.e., when using the rendering frequency graph of FIG. 12A, a method according to exemplary embodiments described herein may result in reducing the of the viewing zone, decreasing the differences in brightness, and making the wave form smoother.

Figure 14:
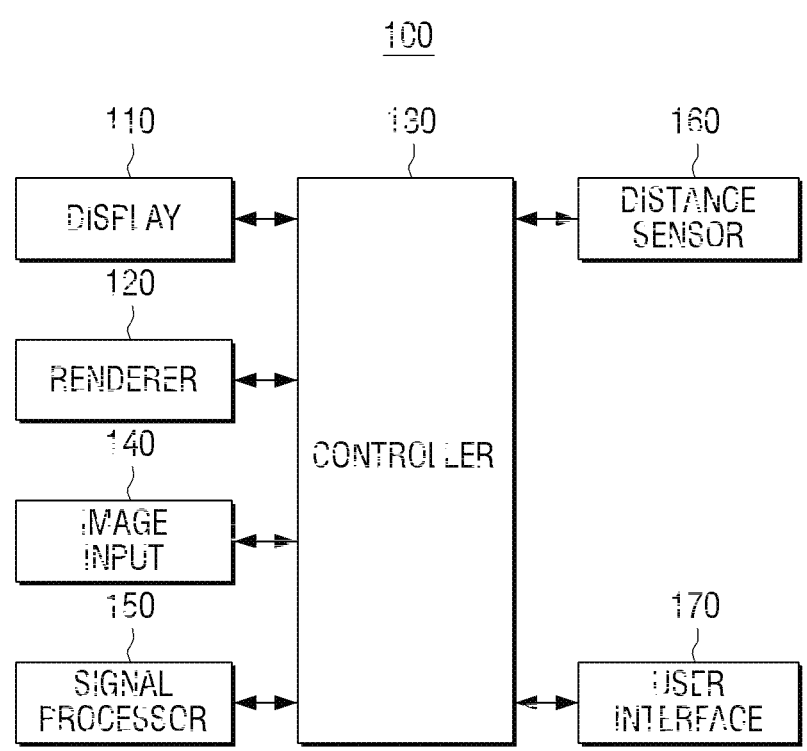
FIG. 14 is a block diagram of a display apparatus according to another exemplary embodiment.

FIG. 14 is a block diagram provided to explain a display apparatus according to another exemplary embodiment. Referring to FIG. 14, the display apparatus 100 may include an image input 140, a signal processor 150, a distance sensor 160, a storage 170 and an user interface 180 as well as the display 110, the renderer 120, and the controller 130.

The image input 140 receives multi-view images. Specifically, it may receive multi-view images from a broadcasting station which transmits broadcasting program contents by using broadcasting networks or from a web server which transmits contents files over the internet. Further, the image input 140 may receive multi-view images from any of various recording medium playing apparatuses which are mounted within or connected to the display apparatus 100. The term "recording medium playing apparatuses" is used herein to indicate devices which play contents stored in various types of recording media such as compact discs (CDs), digital versatile discs (DVDs), hard disks, Blu-ray disks, memory cards, or universal serial bus (USB) memory.

When multi-view images are received from broadcasting networks, the image input 140 may be include a tuner (not illustrated), a demodulator (not illustrated), and a lighter (not illustrated). Meanwhile, when multi-view images are received from sources such as a web server, the image input 140 may be a network interface card (not illustrated). Further, when multi-view images are received from any of the above various recording medium playing apparatuses, the image input 140 may be an interface (not illustrated) which is connected to the recording medium playing apparatus. Accordingly, the image input 140 may be implemented according to any of various exemplary embodiments.

The signal processor 150 performs signal processing on the multi-view images received from the image input 140. Specifically, the signal processor 150 may include a decoder (not illustrated) which decodes the multi-view images, a frame rate converter (not illustrated) which converts the frame rate of the multi-view images to be suitable for the output rate of the display apparatus 100, and a scaler (not illustrated) which performs up or down scaling to be suitable for the screen size of the display 110.

When images having N views corresponding to the N views determined in the display apparatus 100 are received by the image input 140, the generation of multi-view images is unnecessary. However, because receiving images having N views requires the creation of the views with N number of photographing apparatuses used to photograph n-view images, it is uncommon to receive N-view images. Therefore, the image input 140 can generate virtual images from received images having fewer than N views.

For the generation of the N views, the image input 140 may receive depth information of multi-view images. Depth information indicates depth values which are provided with respect to each pixel or sub pixel. For example, Depth information of 8 bits may have a value of 0~255. Depth information may be obtained by a passive method in which only two-dimensional features of images, such as stereo matching, are received, or by an active method in which a device such as a depth camera is used to obtain the depth information. The depth information may be depth map.

The signal processor 150 may generate virtual images by using the image or multi-view image received from the image input 140 and the depth information. For example, when two multi-view images (a first image view and a second image view) are received, several new views may be created between the first and second image views by using the inputted depth information, and thus the original first and second image views may be used to create a requested number of views. Such image processing technology is called three-dimensional warping. Usually, multi-view images generated by using two multi-view images have less distortion than do multi-view images generated by using mono-view images.

The distance sensor 160 measures a distance from the display apparatus 100 to a user, i.e., viewing distance of a user. The distance sensor 160 may include any of various distance measuring apparatuses such as a camera, an infrared sensor, and an ultrasonic wave sensor.

The user interface 170 receives a user command. Specifically, the user interface 170 may receive a user command to determine viewing distance of a user. The user interface 170 may be implemented as any of various types of inputting devices such as a mouse, a keyboard, a touchpad, a touch screen, or a motion sensor. Further, when a user inputs a command through a remote controlling device, the user interface 170 may be implemented as a module which receives controlling signals from the remote controlling device.

The controller 130 may determine the rendering pitch by using information regarding viewing distance obtained from the distance sensor 160 or from the user interface 170.

Figure 15:
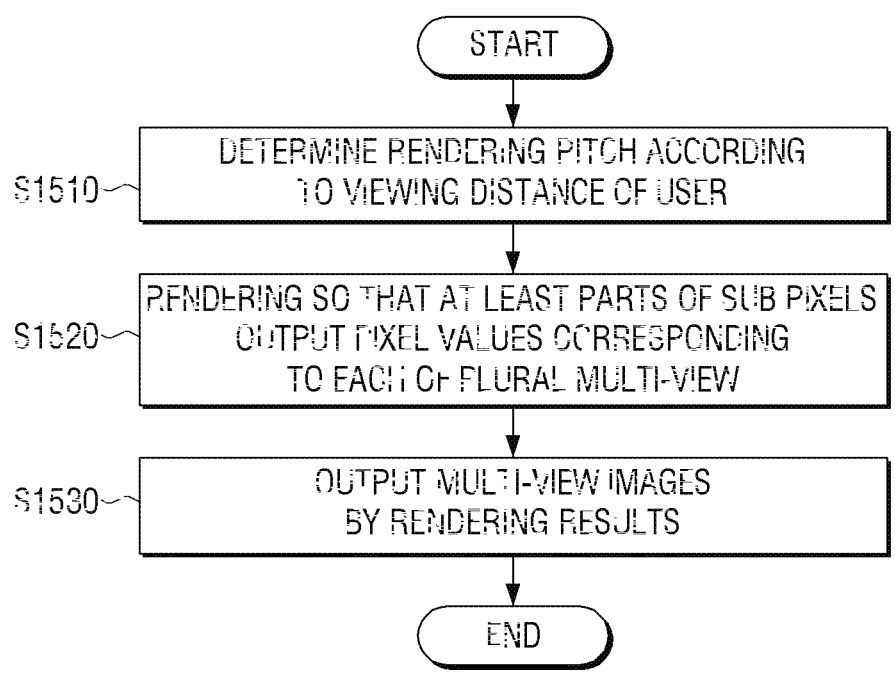
FIG. 15 is a diagram provided to explain a display method according to another exemplary embodiment.

FIG. 15 is a diagram provided to explain a display method according to an exemplary embodiment. The display apparatus 100 determines the rendering pitch according to the viewing distance of the user at S1510. The viewing distance of the user may be obtained from the distance sensor or from a user command to determine viewing distance.

The rendering pitch may be determined as inversely proportional to the viewing distance of the user. Specifically, the rendering pitch may be determined by a formula 4 below.

$$X = \frac{(L_1 + L_2)P_1}{L_1 \times N}$$ [Formula 4]

wherein X is the rendering pitch, N is the number of views, L1 is the viewing distance of the user, L2 is the distance from the parallax barrier or the lenticular lens to the display panel, and P1 is the length of the parallax barrier or the lenticular lens for one frequency corresponding to N views. The method determining the rendering pitch according to viewing distance of a user is already described with reference to FIG. 3, which will not be further explained.

At S1520, rendering is performed so that at least come of a plurality of sub pixels of the display output sub pixel values corresponding to multi-view images according to the determined rendering pitch. Specifically, rendering may be performed so that at least some of the plurality of sub pixels outputs a combined sub pixel value calculated based on a first sub pixel value of a first multi-view image and a second sub pixel value of a second multi-view image. Herein, the combined pixel value may be calculated based on a mixing ratio of the first and second sub pixel values determined by the rendering pitch. For each sub pixel in which more than two multi-view images are combined, a combined sub pixel value may be calculated. The rendering method of multi-view images is described by referring to FIGS. 4 to 10, which will not be further explained.

Multi-view images are output according to the rendering results at S1530.

The display method according to the various exemplary embodiments described herein may be implemented as programs that can run in a terminal apparatus. Such programs may be stored and used in various types of recording medium.

Specifically, codes to implement the above methods may be stored in various types of non-volatile recording media such as a flash memory, a ROM (read only memory), an EPROM (erasable programmable ROM), an EEPROM (electronically erasable and programmable ROM), a hard disk, a removable disk, a memory card, a USB memory, and a CD-ROM.

The foregoing exemplary embodiments and advantages are merely exemplary and are not to be construed as limiting. The above descriptions can be readily applied to other types of apparatuses. Also, the descriptions of exemplary embodiments are intended to be illustrative, and not to limit the scope of the claims.

What is claimed is:

1. A display apparatus, comprising:
a display panel which comprises a plurality of sub pixels outputs a sub pixel value which is one of a red sub pixel value, a green sub pixel value, and a blue sub pixel value;
a renderer which renders a multi-view image to be outputted by the display panel; and
a controller which determines a rendering pitch based on a viewing distance of a user, and controls the renderer so that at least some of the plurality of sub pixels output a combined sub pixel value, wherein the combined sub pixel value is a combination of values for a sub pixel from at least two different image views of a plurality of image views of the multi-view image, and the combined sub pixel value is determined based on the determined rendering pitch.

2. The display apparatus of claim 1, wherein the combined sub pixel value is calculated based on a first sub pixel value of a first image view of the multi-view image and a second sub pixel value of a second image view of the multi-view image.

3. The display apparatus of claim 2, wherein the controller calculates the combined sub pixel value based on a mixing ratio of the first sub pixel value and the second sub pixel value, wherein the mixing ratio is determined according to the rendering pitch.

4. The display apparatus of claim 1, wherein the rendering pitch is inversely proportional to the viewing distance of the user.

5. The display apparatus of claim 4, wherein:
the display apparatus further comprises one of a parallax barrier and a lenticular lens; and
wherein the controller determines the rendering pitch according to a following mathematical formula:

$$X = \frac{(L_1 + L_2)P_1}{L_1 \times N}$$

wherein X is the rendering pitch, N is a number of views included in the multi-view image, L1 is the viewing distance of the user, L2 is a distance from the one of the parallax barrier and the lenticular lens to the display panel, and P1 is one of a length of the parallax barrier and a length of the lenticular lens for one frequency corresponding to the N number of views.

6. A display method, comprising:
- determining a rendering pitch of a display panel according to a viewing distance of a user;
- rendering a multi-view image so that at least some of a plurality of sub pixels of the display panel output a combined sub pixel value, wherein the combined sub pixel value is a combination of values for a sub pixel from at least two different image views of a plurality of image views of the multi-view image; and
- outputting the multi-view image according to the rendering.

7. The display method of claim 6, wherein the rendering comprises rendering the multi-view image so that the combined sub pixel value is calculated based on a first sub pixel value of a first image view of the multi-view image and a second sub pixel value of a second image view of the multi-view image.

8. The display method of claim 7, wherein the rendering comprises calculating the combined sub pixel value based on a mixing ratio of the first sub pixel value and the second sub pixel value, wherein the mixing ratio is determined according to the rendering pitch.

9. The display method of claim 6, wherein the rendering pitch is inversely proportional to the viewing distance of the user.

10. The display method of claim 9, wherein the determining the rendering pitch comprises determining the rendering pitch according to a following mathematical formula:

$$X = \frac{(L_1 + L_2)P_1}{L_1 \times N}$$

wherein X is the rendering pitch, N is a number of views included in the multi-view image, L1 is the viewing distance of the user, L2 is a distance from one of a parallax barrier and a lenticular lens to the display panel, and P1 is one of a length of the parallax barrier and a length of the lenticular lens for one frequency corresponding to the N number of views.

11. A display apparatus, comprising:
- a renderer which renders a multi-view image, comprising a plurality of image views; and
- a display panel, comprising a plurality of sub pixels, which outputs the rendered multi-view image received from the renderer,
- wherein the renderer determines a rendering pitch of the multi-view image based on a viewing distance of a user, and renders the multi-view image so that each of at least some of a plurality of sub pixels of the display panel outputs a combined sub pixel value, wherein the combined sub pixel value is a ratio of values for a sub pixel from at least two different image views of a plurality of image views included in the multi-view image, and the ratio is determined according to the rendering pitch.

12. A display method comprising:
- determining a rendering pitch of a display panel according to a viewing distance of a user;
- rendering a multi-view image so that each of at least some of a plurality of sub pixels of the display panel outputs a combined sub pixel value, wherein the combined sub pixel value is a ratio of values for a sub pixel from at least two different image views of a plurality of image views included in the multi-view image, and the ratio is determined according to the rendering pitch.

13. The display method of claim 12,
wherein the ratio is a ratio of areas of the sub-pixel covered by each of the plurality of image views.

* * * * *